United States Patent Office

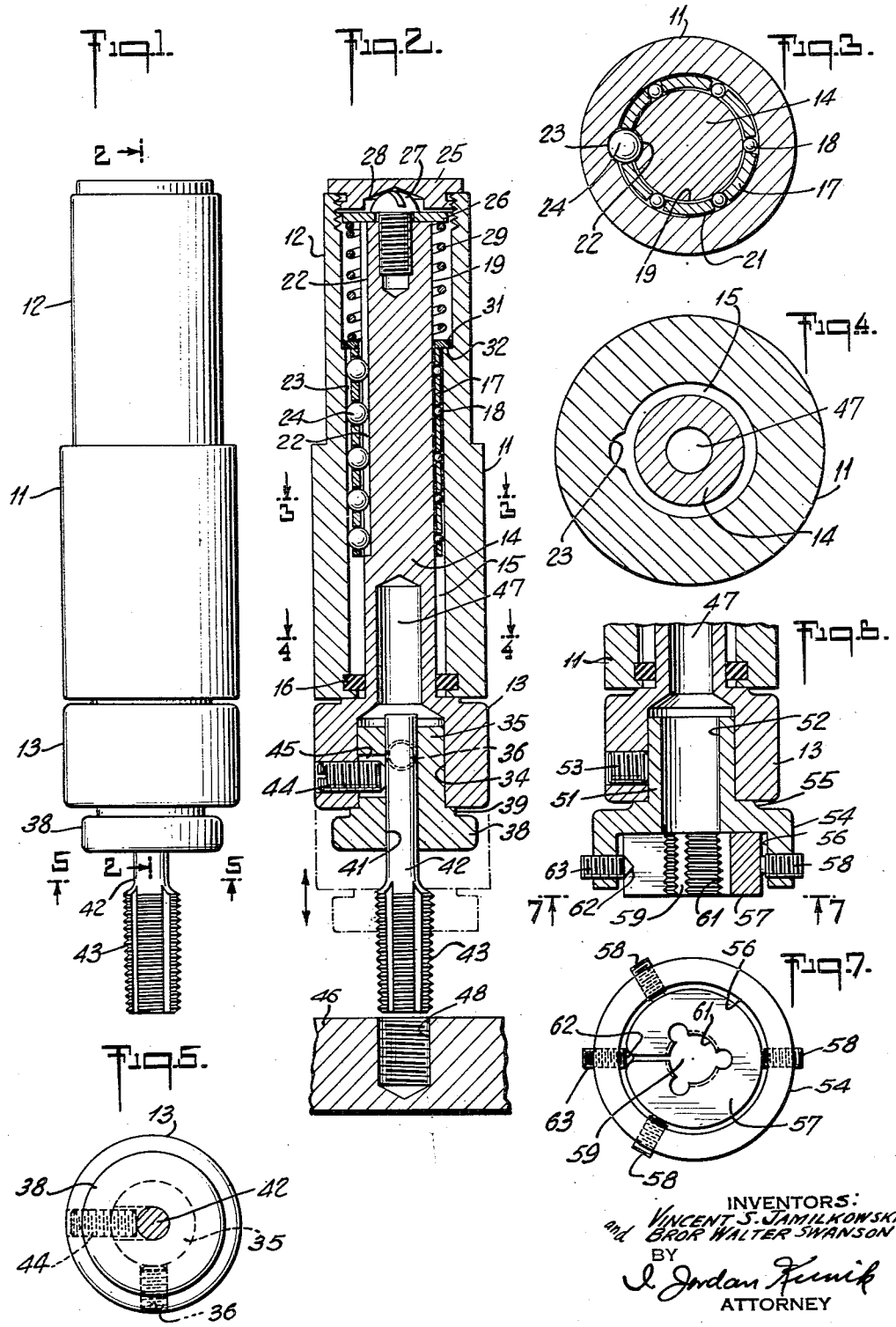

2,772,094
Patented Nov. 27, 1956

2,772,094
TOOL HOLDERS

Vincent S. Jamilkowski, East Hartford, and Bror Walter Swanson, West Hartford, Conn.

Application January 19, 1954, Serial No. 404,862

2 Claims. (Cl. 279—16)

This invention relates to tool holders, and more particularly to a tool holder having novel features of construction.

Many of the difficulties encountered in production tapping and threading on automatic machinery are traceable to misalignment between the work spindle and the tool holder, and to poor functioning of the holder. The holder of the present invention is designed to provide a high degree of accuracy of alignment between the work spindle and the holder. It also provides frictionless axial movement of its tool holding member as the tool enters into the work piece. The holder of the present invention is positive in action, is non-sticking, and is more simply and economically constructed than those of the prior art.

Still other objects and advantages of our invention will be apparent from the specification.

The features of novelty which we believe to be characteristic of our invention are set forth herein and will best be understood, both as to their fundamental principles and as to their particular embodiments, by reference to the specification and accompanying drawings, in which:

Figure 1 is an elevation of the tool holder of the present invention;

Fig. 2 is a vertical central cross section of the tool holder taken on line 2—2 of Fig. 1;

Fig. 3 is a section view taken on line 3—3 of Fig. 2;

Fig. 4 is a greatly enlarged section view taken on line 4—4 of Fig. 2;

Fig. 5 is a view taken on line 5—5 of Fig. 1;

Fig. 6 is a broken away vertical central cross section of another embodiment of the tool holder of the present invention; and Fig. 7 is a section view taken on line 7—7 of Fig. 6.

Referring now to the drawings in detail, the tap holder of the present invention comprises a cylindrical housing 11 having an upper or rearward shank portion 12 of reduced diameter which is adapted to fit into the turret of a screw machine, the chuck of a lathe, drill press, or the like.

A chuck body 13 is mounted at the forward end of tap holder 11, body 13 having a shank 14 extending longitudinally into the central aperture 15 of the tap holder 11. An annular shoulder on the rearward face of chuck body 13 abuts the forward face of housing 11.

At the forward end of housing 11 and on the internal periphery thereof, there is an annular groove which accommodates resilient ring 16. A close sliding fit is provided between the internal diameter of ring 16 and the external periphery of shank 14, thereby providing an effective seal to prevent dirt, chips, and oil from entering the inside of housing 11. Ring 16 may be made of any suitable resilient material such as rubber, neoprene, or other suitable material.

Positioned substantially intermediate the ends of the tool holder, and between shank 14 and housing 11, is a substantially cylindrical ball cage 17. Mounted in ball cage 17 and rotating freely therein are a plurality of balls 18 whose surfaces engage the outer periphery 19 of shank 14 and the internal periphery 21 of housing 11. As shown in Fig. 3, balls 18 are spaced through a transverse arc of more than 180° around shank 14 and serve to maintain shank 14 substantially centralized relative to housing 11.

On one side of shank 14 there is provided a longitudinal groove 22 opposite which there is provided a corresponding longitudinal groove 23 on the internal periphery 21 of housing 11. Mounted in ball cage 17 and positioned in the space between grooves 22 and 23 are a plurality of balls 24 having a somewhat larger diameter than balls 18. Ball cage 17 and balls 18 and 24 provide for the frictionless and free longitudinal movement of shank 14 within housing 11. At the same time balls 24 cooperating with grooves 22 and 23 provide a key arrangement to prevent rotational movement of shank 14 relative to housing 11.

Balls 24 constitute a frictionless rolling key while the perforated tubular ball cage 17 floats in the space between shank 14 and tap holder housing 11 and serves to keep balls 18 and 24 spaced apart. The rearward end of housing 11 is enclosed by a threaded cap 25.

Mounted on the rearward end of shank 14 is a ring 26 maintained in position thereon by screw 27, a recess 28 being provided in cap 25 to accommodate the head of screw 27. Ring 26, whose diameter is somewhat greater than the diameter of shank 14, is spaced slightly apart from the internal face of cap 25. A coiled spring 29 is mounted around shank 14, one end of said spring abutting against ring 26 and the other end of said spring urging against ring 31 which abuts shoulder 32 on the internal periphery of shank 12, the internal diameter of said ring being smaller than that of aperture 15 to provide a stop for spring 29. The action of spring 29 normally urges shaft 14 rearward into housing 11.

The forward end of chuck body 13 has an internal aperture 34 which is adapted to accommodate a removable chuck 35 closely fitting therein. Chuck 35 is fastened into chuck body 13 by means of screw 36 (see Figs. 2 and 5) threaded through an aperture in the side of chuck body 13, the bottom end of said screw being adapted to impinge against the outer periphery of chuck 35 to clamp it securely in position.

The forward portion of chuck 35 extends beyond the forward end of chuck body 13 and widens out into a flange 38. The rearward surface of flange 38 is separated from the forward surface of chuck body 13 by means of a collar portion 39, said separation providing convenient means for the insertion of a suitable tool for removing chuck 35 from chuck body 13.

A longitudinal axial aperture 41 is provided in chuck 35 to accommodate shank 42 of a threading tap or tool. Shank 42 is maintained in position in chuck 35 by means of screw 44 threaded through the side of chuck body 13, a side hole 45 being provided in chuck 35 for the free movement of said screw.

It will be noted that chuck 35 is an expendable piece since it is made up specially for each tapping set-up when such work is on a mass production basis. In order to insure that longitudinal axial aperture 41 is in perfect alignment for the tapping set-up where the threaded portion 43 of the tap is to enter into work piece 46 in perfect alignment, a chuck 35 having no axial aperture is inserted into chuck body 13 and clamped therein by means of screw 36. With tap holder shank portion 12 inserted into the turret of a screw machine, the tailstock of a lathe, or the like, a tool in the head stock of the machine is arranged to bore axial aperture 41 in chuck 35, said tool being in the exact position with which the tapping hole will later be aligned for the tap 42. Thus, aperture 41 is drilled and reamed in such manner that the tap that is inserted therein will be positioned in perfect alignment to perform its work on work piece 46.

In order to provide opportunity for the drill and reamer to bore and smooth aperture 41 for its whole length, there is provided in shank 14 a central longitudinal recess 47, said recess being somewhat wider than hole 41 that is to be drilled and reamed in chuck 35. Thus, ample clearance is provided for the drill and reamer to penetrate through and beyond chuck 35, and also to provide a space into which the shank of the tap may extend. After hole 41 has been suitably drilled and reamed, chuck 35 may remain in position, or it may be removed to clean out the chips and dirt in recess 47, re-inserted into chuck body 13 and clamped in position by means of screw 36. Thereafter, the shank of tap 42 may be inserted into chuck 35 and clamped in position therein by means of screw 44.

When a particular chuck 35 has served its purpose, it may be discarded and a new chuck 35 may be prepared by the foregoing method for a subsequent tapping job.

In operation, the threaded portion 43 of tap 42 is brought into position near or into the prepared hole 48 which is to be tapped. As work piece 46 rotates, and the threaded portion 43 of tap 42 enters into and cuts threads in hole 48, chuck body 13 and shank 14 are drawn longitudinally forward and out of housing 11 against the action of spring 29. As that longitudinal movement takes place, balls 18 and 24 provide for frictionless movement of shank 14 within housing 11, while balls 24 act as a frictionless key in grooves 22 and 23 to prevent the rotation of shank 14, consequently preventing the rotation of tap 42. Ring 16 is sufficiently yieldable to provide a smooth sliding fit between itself and the outer periphery of shank 14 without providing any appreciable resistance against the longitudinal movement of the shank.

After the hole has been tapped, the work piece is reversed in rotation and tap 42 withdraws under the action of spring 29 urging against ring 26, thereby pulling shank 14 of chuck head 13 back into housing 11. The outward and inward movement of shank 14 is substantially frictionless and provides for smooth operation of the tap in its work while at the same time the key balls 24 maintain the tap aligned with tap housing 11, thereby ensuring accuracy of the tapping function.

The frictionless holder of the present invention may also be adapted for die threading as illustrated in Figs. 6 and 7. There is inserted into the internal aperture of chuck body 13 the shank of an adapter 51 having a central aperture 52 aligned with aperture 47. Adapter 51 is fixed in position by screw 53 threadably inserted through the wall of chuck body 13, in the same manner as chuck 35 is fixed in position by screw 36 in Figs. 2 and 5.

The forward portion of adapter 51 extends beyond the forward end of chuck body 13 and widens out into an annular flange 54. The rearward surface of flange 54 is separated from the forward surface of chuck body 13 by means of a collar portion 55, said separation providing convenient means for the insertion of a tool for removing adapter 51 from chuck body 13.

Aperture 56 within flange 54 accommodates a split ring threading die 57 secured in position by adjusting and binding screws 58 extending threadably through through flange 54. Die 57 has a central aperture 59 axially aligned with apertures 52 and 47, and the walls 61 of which constitute a die for cutting threads on various work pieces.

The ends of split ring 57 are rounded at the periphery thereof whereby they are engaged by the wedge-shaped nose 62 of spreading screw 63, thereby providing means for adjusting the diameter of threaded aperture 59.

Since the threading die is engaged in the same frictionless bearing ball mounting as described above for the tapping device for cutting inside threads, it is apparent that the same advantages will accrue to provide superior operation for cutting outside threads on work pieces.

In this specification, we have explained the principles of our invention, and the best mode in which we have contemplated applying those principles, so as to distinguish our invention from other inventions; and we have particularly pointed out and distinctly claimed the part, mode or combination which we claim as our invention or discovery.

While we have shown and described certain preferred embodiments of our invention, it will be understood that modifications and changes may be made without departing from the function and scope thereof, as will be clear to those skilled in the art.

We claim:

1. A tool holder comprising a housing, a chuck body movable longitudinally within said housing, a tubular ball cage positioned between said housing and said chuck body, said cage being movable longitudinally relative to either and to both said housing and said chuck body, a first plurality of balls of a substantially uniform size mounted in said ball cage and positioned to roll simultaneously on the inner periphery of said housing and on the outer periphery of said chuck body, said first balls being arrayed through a transverse arc of more than 180°, a longitudinal groove in the inner periphery of said housing, a longitudinal groove in the outer periphery of said chuck body and positioned opposite said first mentioned groove, a second plurality of balls mounted in said ball cage and having a diameter larger than the first mentioned plurality of balls, said second plurality of balls being movable longitudinally with said ball cage relative to either and to both said housing and said chuck body, said larger diameter balls engaging both of said grooves for longitudinal movement only therein, said larger diameter balls preventing the rotation of said chuck body relative to said housing.

2. A tool holder comprising a housing, a chuck body movable longitudinally within said housing, a tubular ball cage positioned between said chuck body and said housing and movable longitudinally therebetween, a plurality of balls in said cage and movable therewith, said balls being arrayed through a transverse arc of more than 180° to maintain said chuck body substantially centralized relative to said housing, a longitudinal groove in the inner periphery of said housing, a longitudinal groove in the outer periphery of said chuck body and positioned opposite said first mentioned groove, a second plurality of balls of larger diameter than said first mentioned balls, said larger balls being mounted in said cage and aligned therein to coact with and move longitudinally only within both said grooves and together with the longitudinal movement of said cage, said larger balls preventing the rotation of said chuck body relative to said housing.

References Cited in the file of this patent

UNITED STATES PATENTS

| | | |
|---|---|---|
| 389,627 | Wirshing | Sept. 18, 1888 |
| 857,151 | Booth | June 18, 1907 |
| 1,393,380 | Kight | Oct. 11, 1921 |
| 1,645,948 | Galloway et al. | Oct. 18, 1927 |
| 1,757,125 | Levedahl | May 6, 1930 |
| 2,193,615 | Ashley | Mar. 12, 1940 |
| 2,338,095 | Campbell | Jan. 4, 1944 |
| 2,371,330 | Irstad | Mar. 13, 1945 |
| 2,530,297 | Gates | Nov. 14, 1950 |

FOREIGN PATENTS

| | | |
|---|---|---|
| 222,342 | Germany | May 23, 1910 |
| 416,636 | Italy | Dec. 10, 1946 |